United States Patent
Fregene

(10) Patent No.: US 8,255,153 B2
(45) Date of Patent: Aug. 28, 2012

(54) AUTOMATIC ALERTING METHOD AND SYSTEM FOR AERIAL VEHICLE TARGET TRACKING

(75) Inventor: Kingsley Fregene, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 1254 days.

(21) Appl. No.: 12/018,641

(22) Filed: Jan. 23, 2008

(65) Prior Publication Data
US 2009/0187338 A1 Jul. 23, 2009

(51) Int. Cl. *G01C 21/00* (2006.01)
(52) U.S. Cl. .................... 701/408
(58) Field of Classification Search .......... 701/408, 701/301, 519–520, 3, 400, 500, 501; 244/3.2; 340/963, 971
See application file for complete search history.

(56) References Cited

U.S. PATENT DOCUMENTS

| | | | |
|---|---|---|---|
| 5,581,250 A * | 12/1996 | Khvilivitzky | 340/961 |
| 5,633,642 A * | 5/1997 | Hoss et al. | 342/70 |
| 5,783,825 A * | 7/1998 | Wiese | 250/330 |
| 6,910,657 B2 | 6/2005 | Schneider | |
| 7,307,579 B2 | 12/2007 | Rees et al. | |
| 7,373,242 B2 * | 5/2008 | Yamane | 701/200 |
| 7,460,148 B1 * | 12/2008 | Clark et al. | 348/143 |
| 2007/0061066 A1 * | 3/2007 | Bruelle-Drews | 701/200 |
| 2007/0093945 A1 | 4/2007 | Grzywna et al. | |
| 2007/0250260 A1 * | 10/2007 | Ariyur et al. | 701/207 |
| 2007/0268364 A1 | 11/2007 | Neff et al. | |
| 2009/0093960 A1 * | 4/2009 | Puhalla et al. | 701/301 |
| 2010/0121574 A1 * | 5/2010 | Ariyur et al. | 701/301 |
| 2010/0256909 A1 * | 10/2010 | Duggan et al. | 701/301 |

OTHER PUBLICATIONS

Jusuk Lee etl al, Strategies of Path-Planning for a UAV to Track a Ground Vehicle, AINS, Menlo Park, CA, Jun. 2003.

* cited by examiner

*Primary Examiner* — Ryan Zeender
*Assistant Examiner* — Kristie A Mahone
(74) *Attorney, Agent, or Firm* — Shumaker & Sieffert, P.A.

(57) ABSTRACT

This invention provides a system and method for automatically inferring when a target that is being tracked by an aerial vehicle is doing something significant (e.g. stopping suddenly, changing direction quickly or getting out of track view), and consequently alerting an operator. The alerting system also provides a classification of what the target is doing. It frees the operator from continuously monitoring the imagery stream so the operator can perform other tasks.

20 Claims, 6 Drawing Sheets

AUTOMATIC ALERTING METHOD AND SYSTEM FOR AERIAL VEHICLE TARGET TRACKING

GOVERNMENT LICENSE RIGHTS

The U.S. Government may have certain rights in the present invention as provided for by the terms of Contract No. FA8650-04-C-7142 with the Defense Advanced Research Projects Agency.

BACKGROUND TECHNOLOGY

Aerial vehicles (AVs) are manned or unmanned aircraft that can be remotely piloted or self-piloted by an onboard computer system and can carry cameras, sensors, communications equipment, or other payloads. They have been used in a reconnaissance and intelligence-gathering role for many years. More recently, AVs have been developed for the purpose of surveillance and target tracking.

Autonomous surveillance and target tracking performed by AVs in either military or civilian environments is becoming an important aspect of intelligence-gathering. Typically, when a target is being tracked from aerial vehicles (e.g. an AV), human operators must closely monitor imagery streamed from the aircraft to assess target behavior and ensure that the target continues to be in view.

SUMMARY

This invention provides a system and method for automatically inferring when the target is doing something significant (e.g. stopping suddenly, changing direction quickly or getting out of track view) and alerting the operator. The alerting system also provides a classification of what the target is doing. It frees the operator from continuously monitoring the imagery stream so the operator can perform other tasks.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

Figure 1:
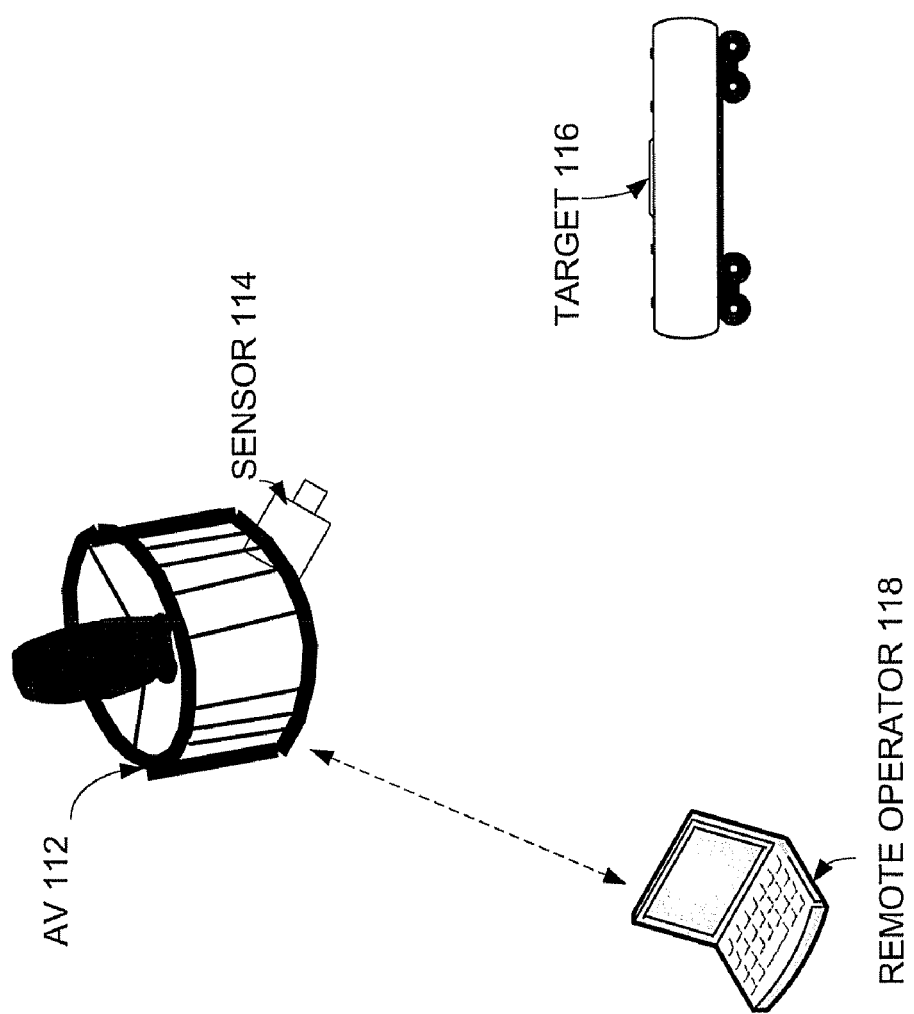
FIG. 1 is a schematic diagram depicting a system for aerial tracking of a ground vehicle according to one embodiment of the invention.

FIG. 1 is a simplified diagram depicting a system 100 for automatically tracking a target from an AV. As shown in FIG. 1, the system includes (1) an AV 112 equipped with at least one sensor 114, (3) a target 116 and (4) a remote operator 118. It should be understood that while remote operator 118 is shown in FIG. 1, remote operator 118 may be many miles away from AV 112 and target 116.

The AV 112 is an aircraft capable of being remotely piloted or self-piloted. AV 112 may carry cameras, sensors, communications equipment, or other payloads. AV 112 may be a hover-capable aerial vehicle or a fixed-wing aerial vehicle. Sensor 114 may be any device capable of imaging a target, such as a camera or radar. Target 116 may be anything being monitored by AV 112. For example, target 116 may be a ground-based vehicle, an air-based vehicle, or a person. To acquire a target, AV 112 typically sends images from sensor 114 to remote operator 118. Remote operator 118 then defines an area in the image as the target, and sends the target to AV 112.

Remote operator 118 may be any device capable of communicating with AV 112. In addition, remote operator 118 may be configured to remotely control AV 112. Remote operator 118 may be a device such as a desktop computer equipped with a joystick, laptop, or personal data assistant ("PDA"), for example.

Figure 2:
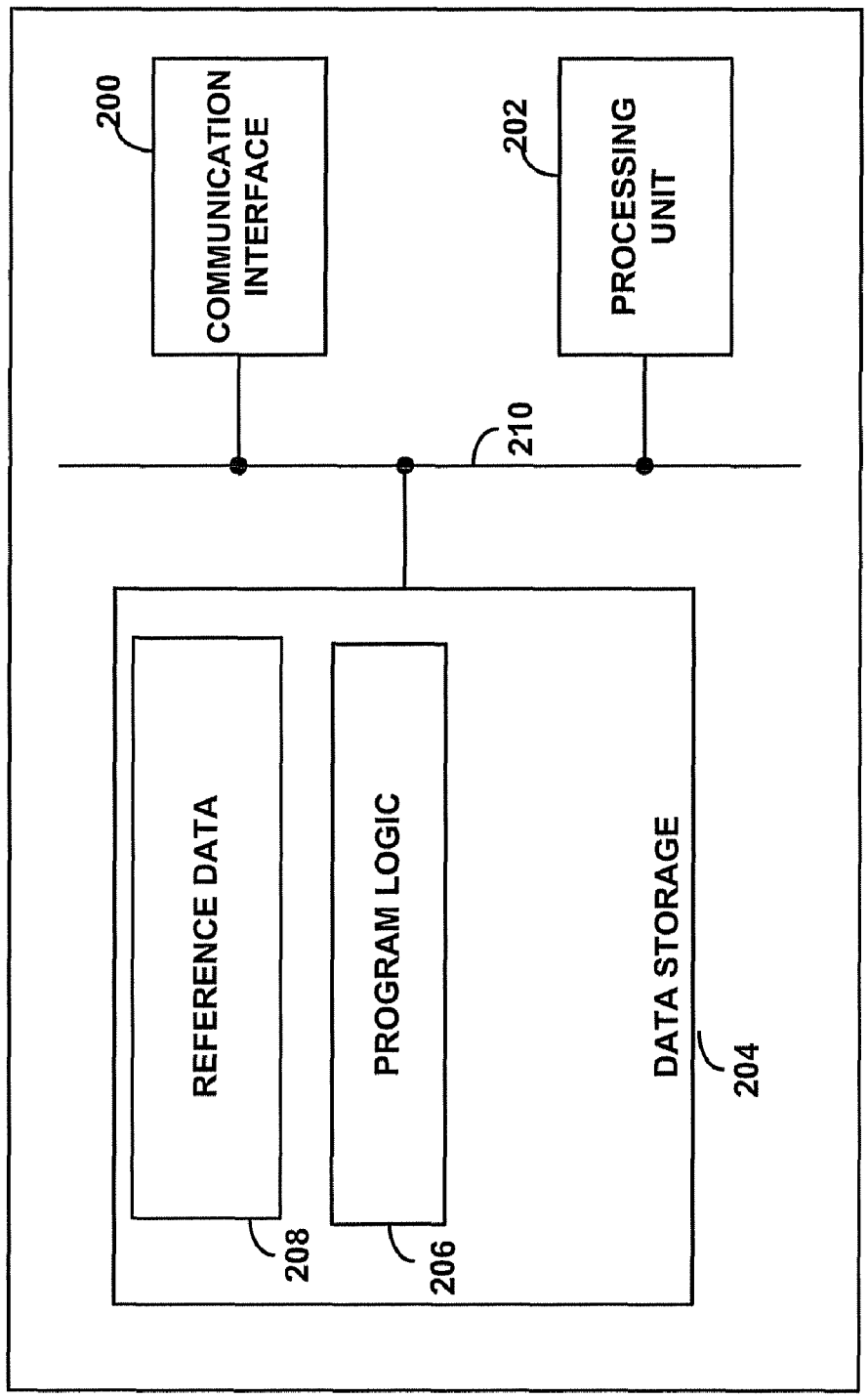
FIG. 2 is a simplified block diagram of an entity arranged to implement aspects of the exemplary embodiment.

Aspects of the present invention may be carried out by AV 112 and/or remote operator 118 (or any other entity capable of controlling AV 112). FIG. 2 depicts functional components that may be included in AV 112 and/or remote operator 118 to carry out various aspects of the invention. As shown in FIG. 2, the components include a communication interface 200, a processing unit 202, and data storage 206, all of which may be coupled together by a system bus, network, or other mechanism 210.

Communication interface 200 comprises a mechanism for communicating over an air interface, so as to facilitate communication between AV 112 and remote operator 118. Further, communication interface 200 may include one or more antennas to facilitate air interface communication.

Processing unit 202 comprises one or more general purpose processors (e.g., INTEL microprocessors) and/or one or more special purpose processors (e.g., digital signal processors). Data storage 204, in turn, comprises one or more volatile and/or non-volatile storage mechanisms, such as memory and/or disc-drive storage for instance, which may be integrated in whole or in part with processing unit 202.

As shown, data storage 204 includes program logic 206 and reference data 208. Program logic 206 comprises one or more logic modules (applications), and preferably includes machine language instructions executable by processing unit 204 to carry out various functions described herein, such as (1) identifying the coordinates of the footprint of sensor 114, (2) computing a normalized track metric as a function of how close the target is to the center of the footprint, (3) comparing the track metric to a threshold value, and (4) alerting remote operator 118 if the track metric (or its time derivatives) falls outside a threshold value. Reference data 208, in turn, may include data such as imaging data acquired by sensor 114.

Figure 3:
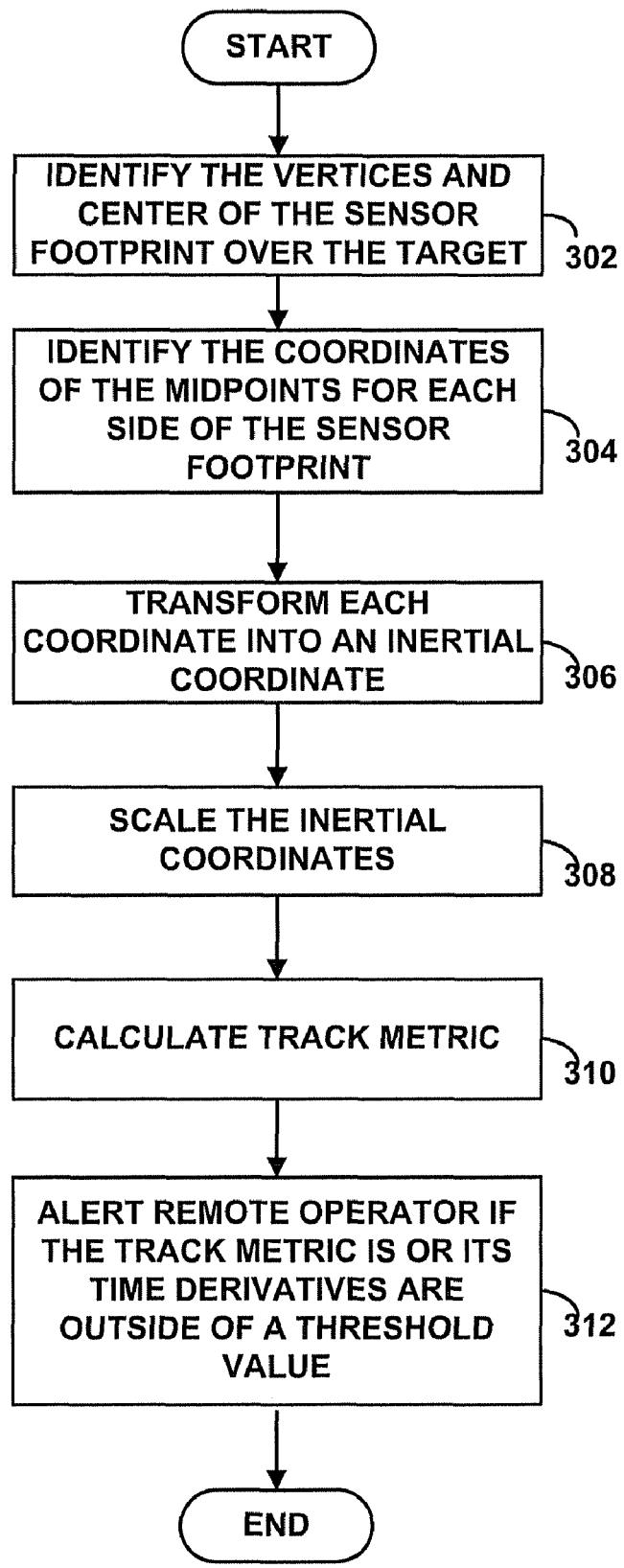
FIG. 3 is a flow chart depicting functions that can be carried out in accordance with the exemplary embodiment.

FIG. 3 is a flow chart depicting automatically alerting a remote operator about the status of a vehicle being tracked by an AV in accordance with an embodiment of the invention. In particular, FIG. 3 depicts (1) identifying the coordinates of the footprint of sensor 114, (2) computing a normalized track metric as a function of how close the target is to the center of the footprint, (3) comparing the track metric to a threshold value, and (4) alerting remote operator 118 if the track metric (or its time derivatives) falls outside the threshold value.

Figure 4:
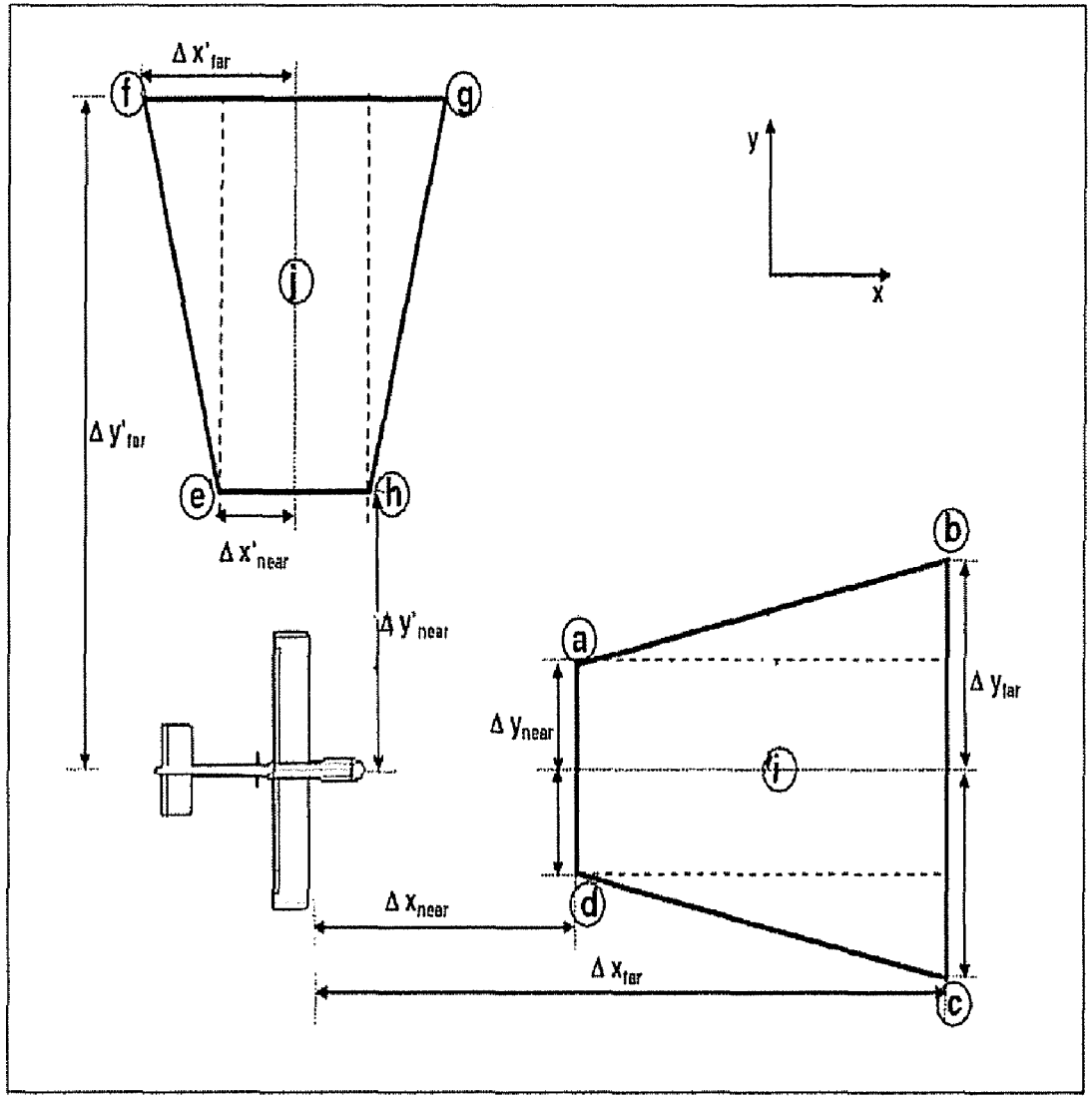
FIG. 4 is a diagram depicting an example of a sensor footprint.

As shown in FIG. 3, at step 302, AV 112 identifies the coordinates of the vertices and center of the footprint (i.e., the viewing window) of sensor 114. Examples of sensor footprints are depicted in FIG. 4. As shown in FIG. 4, AV 112 is equipped with forward and side looking sensors. Forward looking sensor footprint 402 includes vertices {a, b, c, d}. The center of footprint 402 is identified as {i}. Side-looking sensor footprint 404 includes vertices {e, f, g, h}. The center of side-looking sensor footprint is identified as {j}.

Figure 6:
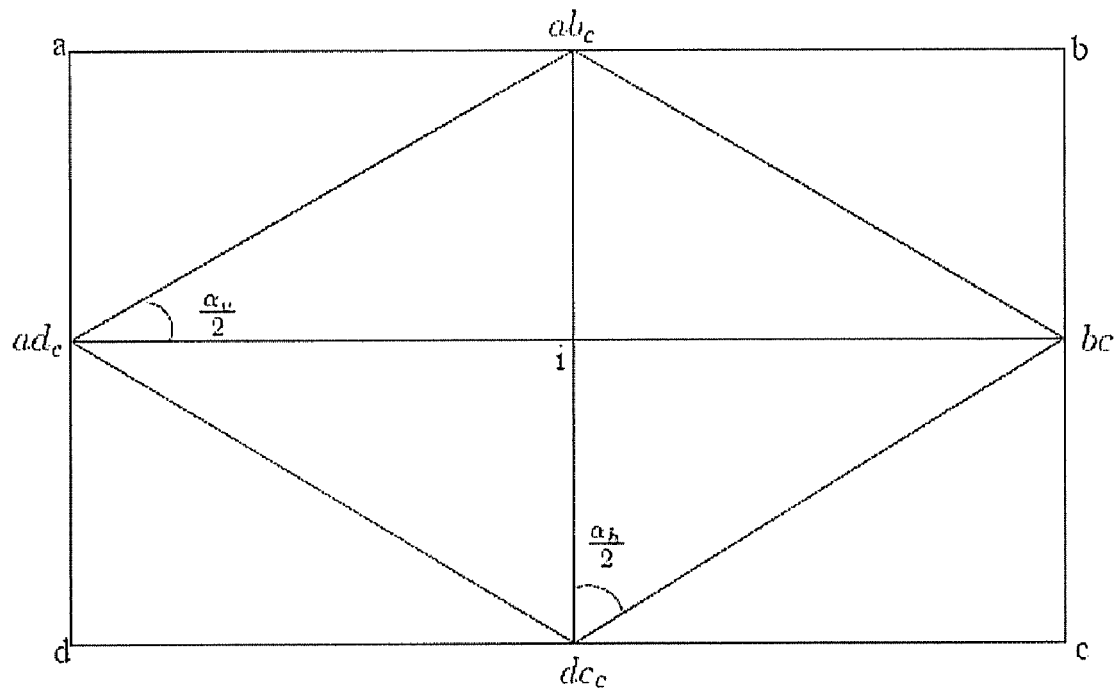
FIG. 6 depicts a forward-looking sensor footprint that has been normalized.

FIG. 6 depicts a forward-looking sensor footprint that has been normalized (i.e., displayed as a rectangle). As shown in FIG. 6, the footprint includes vertices {a, b, c, d}, center {i} midpoints {$ad_c$, $ab_c$, $bc_c$, $dc_c$}, and angles $$\left\{\frac{\alpha_v}{2}, \frac{\alpha_h}{2}\right\},$$

where $\alpha_h$ and $\alpha_v$ are the horizontal and vertical field of view angles for sensor 114.

Returning to FIG. 3, the coordinates of the vertices and center of the sensor footprint may be computed using the following data:

$[\alpha_h, \alpha_v]$, the horizontal and vertical field of view for sensor 114;

$[\theta, \phi, \psi]$, the attitude angles of AV 112, where $\theta$, is the pitch, $\phi$ is the roll, and $\psi$ is the yaw. In this example climb requires a positive pitch, the right wing down is a positive roll and clockwise from the top of the vehicle is a positive yaw;

$[\theta_c, \phi_c, \psi_c]$, the attitude angles of sensor 114, where $\theta$, is the pitch, $\phi$ is the roll, and $\psi$ the yaw. In this example, pitch is measured between 0 and 90 degrees measured from straight down. The Camera lookdown angle is $(1-\theta_c)$, the roll angle is positive right and the yaw angle is positive in the clockwise direction. Consequently, a forward facing sensor 114 has $\psi_c=0$, while a left-pointing camera has a $\psi_c=-90$ degrees; and

[N, E, h], the position coordinates of AV 112 where N=north, E=east, and h=height from some reference point (such as UTM northings, eastings and altitude).

The local coordinates of the vertices and center of the footprint are identified as follows:

$$\begin{bmatrix} a \\ b \\ c \\ d \\ i \end{bmatrix} = \begin{bmatrix} \tan(\frac{\alpha_v}{2}) & -\tan(\frac{\alpha_h}{2}) & 1 \\ \tan(\frac{\alpha_v}{2}) & \tan(\frac{\alpha_h}{2}) & 1 \\ -\tan(\frac{\alpha_v}{2}) & \tan(\frac{\alpha_h}{2}) & 1 \\ -\tan(\frac{\alpha_v}{2}) & -\tan(\frac{\alpha_h}{2}) & 1 \\ 0 & 0 & 1 \end{bmatrix}$$

At step 304, the local coordinates of the midpoints for each side of the sensor footprint are identified as follows:

$$\begin{bmatrix} ab_c \\ bc_c \\ dc_c \\ ad_c \end{bmatrix} = \begin{bmatrix} \tan(\alpha_v/2) & 0 & 1 \\ 0 & \tan(\alpha_h/2) & 1 \\ -\tan(\alpha_v/2) & 0 & 1 \\ 0 & -\tan(\alpha_h/2) & 1 \end{bmatrix}$$

At step 306, each local coordinate is transformed to global inertial coordinates by multiplying the coordinate by pitch-roll-yaw rotation matrices $[R]$ and $[R_c]$, where $[R]=[R(\theta)][R(\phi)][R(\psi)]$; and $[R_c]=[R(\theta_c)][R(\phi_c)][R(\psi_c)]$.

Thus, $A=a[R][R_c]$ $B=b[R][R_c]$ $C=c[R][R_c]$ $D=d[R][R_c]$ $I=i[R][R_c]$ $AB_c=ab_c[R][R_c]$ $BC_c=bc_c[R][R_c]$ $DC_c=dc_c[R][R_c]$ $AD_c=ad_c[R][R_c]$ Rotational matrices are well known in the art, and are not described in detail here.

At step 308 the scaled coordinates of the sensor footprint are computed by scaling the inertial coordinates by the height (h) that AV 112 is flying above the ground (if target 116 is a ground target), or the height of AV 112 is flying above the target 116 (if target 116 is not necessarily on the ground). The footprint is calculated as follows:

$$A_g = A \times \frac{h}{A(3)}$$

$$B_g = B \times \frac{h}{B(3)}$$

$$C_g = C \times \frac{h}{C(3)}$$

$$D_g = D \times \frac{h}{D(3)}$$

$$I_g = I \times \frac{h}{I(3)}$$

$$AB_{cg} = AB_c \times \frac{h}{AB_c(3)}$$

$$BC_{cg} = BC_c \times \frac{h}{BC_c(3)}$$

$$DC_{cg} = DC_c \times \frac{h}{DC_c(3)}$$

$$AD_{cg} = AD_c \times \frac{h}{AD_c(3)}$$

After computing the various coordinates of sensor 114's sensor footprint, at step 310, a track metric $\rho$ is calculated by (1) calculating a series of instantaneous normalized track metrics ($\rho_{TR}$) over time, and (2) calculating a weighted moving average of the instantaneous normalized track metrics.

Figure 5:
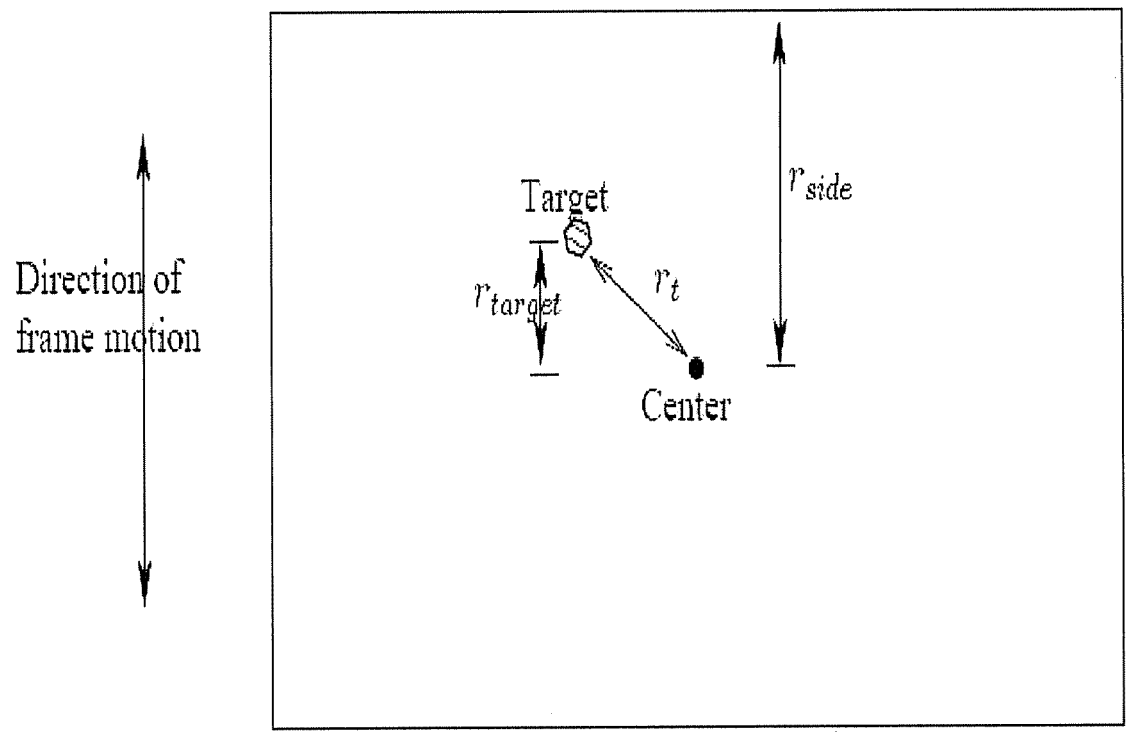
FIG. 5 is a diagram depicting the variables needed to calculate an instantaneous track metric.

$\rho_{TR}$ is calculated using (1) the target's position relative to the center of the camera footprint ($r_{target}$) on the ground, (2) the distance from the center of the camera footprint to the side (e.g., $[AB_{cg} BC_{cg} DC_{cg} AD_{cg}]$ of the footprint that is closest to the target ($r_{side}$), and (3) the distance from the center of the frame to the target ($r_t$). These positions are illustrated in FIG. 5, which is a diagram of a footprint that illustrates variables needed to calculate $\rho_{TR}$. As shown in FIG. 5, the frame includes a center point, a target, $r_{target}$, $r_t$, $r_{side}$, and the direction of the frame of motion.

In order to calculate $\rho_{TR}$, the value of $r_{target}$ and $r_{side}$ is first calculated. $r_{target}$ is calculated by using the following equation:

$$r_{target} = (\hat{e}_{ct} \cdot \hat{e}_{ce}) r_t$$

where $\hat{e}_{ct}$ and $\hat{e}_{ce}$ are unit vectors along a line from the target to the center of the footprint and from the mid-point of the closest side to the center respectively. That is, $\hat{e}_{ct}$ is the unit vector along $r_t$, while $\hat{e}_{ce}$ is the unit vector along $r_{side}$.

$r_{side}$ is calculated using the following equation:

$$r_{side} = \operatorname{argmin} \begin{Vmatrix} r_{AB_{cg}} - r_{target} \\ r_{BC_{cg}} - r_{target} \\ r_{DC_{cg}} - r_{target} \\ r_{AD_{cg}} - r_{target} \end{Vmatrix}$$

where $r_{AB_{cg}} - r_{AB_{cg}}$ is the distance from the center of the frame to the side of the frame.

After calculating $r_{target}$ and $r_{side}$, $\rho_{TR}$ is calculated as follows:

$$\rho_{TR} = \frac{r_{target}}{r_{side}}$$

If $\rho_{TR} = 0$, then the target 114 is directly over the center of the footprint. This is considered perfect tracking. If $\rho_{TR} \geq 1$, then AV 112 has lost track of target 114. Because AV 112 (and possibly target 116) are moving, $\rho_{TR}$ should be calculated at regular time intervals (i.e., once every 10 ms), although $\rho_{TR}$ could be calculated at random time intervals as well.

After calculating $\rho_{TR}$, the track metric $\rho$ is calculated as the weighted moving average of $\rho_{TR}$, with more weight being placed on recently calculated values of $\rho_{TR}$.

$$\rho = [b_k \ b_{k-1} \ \ldots \ b_{k-n}] \begin{bmatrix} \rho_{TR}(k) \\ \rho_{TR}(k-1) \\ \vdots \\ \rho_{TR}(k-n) \end{bmatrix}$$

where $b_i$ are the weights, and $$\sum_{i=0}^{n} b_{k-i} = 1$$

where k is the sampling instant and n is the moving window over which the averaging is done. For example, if the sample time of the algorithm is $t_s$ and the averaging is done over a time window of t seconds, then:

$$n = \frac{t}{t_s}$$

In addition to calculating $\rho$, the values of the first and second time derivatives of $\rho$ ($\dot{\rho}, \ddot{\rho}$) may be calculated.

After obtaining $\rho$, at step 312, remote operator 118 is alerted when the value of $\rho$, $\dot{\rho}$, or $\ddot{\rho}$ exceeds a threshold value ($\rho_{threshold}$, $\dot{\rho}_{threshold}$, or $\ddot{\rho}_{threshold}$). The threshold values may be a static or dynamic number. For example, the threshold for $\rho$ may be set to be slightly less than one, and remote operator 118 will be alerted if $\rho$ exceeds the threshold. For a fixed-wing AV with a non-steerable track sensor and minimum turn radius $R_{min}$, flying with airspeed V, the threshold values for $\dot{\rho}$ may be determined as follows:

$$\dot{\rho}_{threshold} = \min((\hat{e}_{ct} \cdot \hat{e}_{ce}) \times V, V_{max})$$

Thus, remote operator 118 will be alerted if the value of $\dot{\rho}$ is greater than the lesser of AV 112's maximum airspeed and its current airspeed resolved along the direction that the target is moving in the track sensor frame.

The value of $\ddot{\rho}$ may be determined as follows:

$$\ddot{\rho}_{threshold} = \frac{(\hat{e}_{ct} \cdot \hat{e}_{ce})}{2R_{min}} V^2$$

Therefore, the remote operator 118 will be alerted if $\ddot{\rho}$ is greater than the vehicle's acceleration along the direction of target movement in the frame.

Alerts sent to remote operator 118 in step 312 may be classified into categories. For example, the alert could indicate that AV 112 is about to lose track of target 116 and occurs when $\ddot{\rho}$ is slightly less than 1 (i.e., 0.9), and $\dot{\rho}$ is positive. The alert could also indicate that target 116 is doing something significant, such as stopping suddenly, changing direction quickly, or engaging in aggressive or evasive motion maneuvers. Such an alert could be triggered if $\dot{\rho}$ and $\ddot{\rho}$ both exceed their threshold values.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:
   determining, with a processing unit, global inertial coordinates of a center of a footprint of a sensor and at least two vertices of the footprint, wherein the sensor is equipped on an aerial vehicle;
   computing, with the processing unit, a track metric as a function of how close a target is to the center of the footprint based on the global inertial coordinates of the center and the at least two vertices of the footprint;
   comparing, with the processing unit, the track metric to a threshold value; and
   generating, with the processing unit, an alert for a remote operator if the track metric falls outside the threshold value.

2. The method of claim 1, wherein the threshold value is based on a maximum airspeed of the aerial vehicle.

3. The method of claim 1, wherein the threshold value is based on a minimum turn radius of the aerial vehicle.

4. The method of claim 1, further comprising calculating a first time derivative and a second time derivative of the track metric and generating the alert if the track metric, the first time derivative or the second time derivative exceeds the threshold value.

5. A system comprising:
   a communication interface; and
   a processing unit configured to determine global inertial coordinates of a center of a footprint of a sensor equipped on an aerial vehicle and at least two vertices of the footprint, compute a track metric as a function of how close a target is to a center of the footprint based on the global inertial coordinates of the center and the at least two vertices of the footprint, compare the track metric to a threshold value, and control the communication interface to alert a remote operator if the track metric falls outside the threshold value.

6. The system of claim 5, wherein the processing unit is configured to compare the track metric to the threshold value that is based on a maximum airspeed of the aerial vehicle or a minimum turn radius of the aerial vehicle.

7. A method comprising:
determining, with a processing unit, a position of a target relative to a center of a sensor footprint;
determining, with the processing unit, a distance from the center of the sensor footprint to a side of the sensor footprint that is closest to the target;
calculating, with the processing unit, one or more instantaneous track metrics based on (i) the position of the target relative to the center of the sensor footprint; and (ii) the distance from the center of the sensor footprint to the side of the sensor footprint that is closest to the target;
calculating, with the processing unit, a track metric as a weighted moving average of the instantaneous track metric;
comparing, with the processing unit, the track metric to a threshold value; and
generating, with the processing unit, an alert for a remote operator if the track metric is outside of the threshold value.

8. The method of claim 1, wherein determining the global inertial coordinates of the center and the at least two vertices of the footprint comprises:
determining local coordinates of the center and the at least two vertices of the footprint; and
transforming the local coordinates to the global inertial coordinates based on a first attitude angle of the sensor and a second attitude angle of the aerial vehicle.

9. The method of claim 8, wherein determining local coordinates of the center and the at least two vertices of the footprint comprises determining local coordinates of the center and the at least two vertices of the footprint based on an angle of a field of view of the sensor.

10. The method of claim 1, further comprising scaling the global inertial coordinates of the center and the at least two vertices of the footprint by a height the aerial vehicle is flying above the target, wherein computing the track metric comprises computing the track metric based on the scaled global inertial coordinates of the center and the at least two vertices of the footprint.

11. The method of claim 1, wherein computing the track metric as a function of how close a target is to the center of the footprint comprises:
determining a first distance between the target and the center of the footprint of the sensor; and
determining a second distance from the center of the footprint to a side of the footprint closest to the target, wherein the track metric comprises a value determined by dividing the first distance by the second distance.

12. The method of claim 11, wherein the threshold value is 0.9.

13. The method of claim 4, wherein generating the alert comprises:
generating a first alert that indicates the aerial vehicle is about to lose track of the target if the track metric is 0.9; and
generating a second alert that indicates the target stopped, changed direction or engaged in motion maneuvers if both the first and second time derivatives of the track metric exceed the threshold value.

14. The method of claim 1, wherein computing the track metric comprises:
calculating, over time, a plurality of instantaneous track metrics as the function of how close the target is to the center of the footprint; and
determining the track metric as a weighted moving average of the plurality of instantaneous track metrics.

15. The method of claim 14, wherein weight values are used to determine the weighted moving average.

16. The system of claim 5, wherein the processing unit is configured to determine the global inertial coordinates of the center and the at least two vertices of the footprint by at least determining local coordinates of the center and the at least two vertices of the footprint based on an angle of a field of view of the sensor, and transforming the local coordinates to the global inertial coordinates based on a first attitude angle of the sensor and a second attitude angle of the aerial vehicle.

17. The system of claim 5, wherein the processing unit is configured to scale the global inertial coordinates of the center and the at least two vertices of the footprint by a height the aerial vehicle is flying above the target, and compute the track metric based on the scaled global inertial coordinates of the center and the at least two vertices of the footprint.

18. The system of claim 5, wherein the processing unit is configured to calculate a first time derivative and a second time derivative of the track metric, wherein the processing unit is configured to generate the alert by at least:
determining if the track metric exceeds the threshold value and generating a first alert that indicates the aerial vehicle is about to lose track of the target if the track metric is 0.9; and
determining if both the first and second time derivatives of the track metric exceed the threshold value and generating a second alert that indicates the target stopped, changed direction or engaged in motion maneuvers if both the first and second time derivatives of the track metric exceed the threshold value.

19. The system of claim 5, wherein the processor is configured to compute the track metric by at least determining a first distance between the target and the center of the footprint of the sensor, and determining a second distance from the center of the footprint to a side of the footprint closest to the target, wherein the track metric comprises a value determined by dividing the first distance by the second distance.

20. The system of claim 5, wherein the processing unit is configured to compute the track metric by at least calculating, over time, a plurality of instantaneous track metrics as the function of how close the target is to the center of the footprint, and determining the track metric as a weighted moving average of the plurality of instantaneous track metrics.

* * * * *